May 13, 1958  J. J. SIMMONDS  2,834,485
TRAILER TRUCK FOR RAILROAD CARS AND LOADING DOCK THEREFOR
Filed Feb. 21, 1955  6 Sheets-Sheet 1
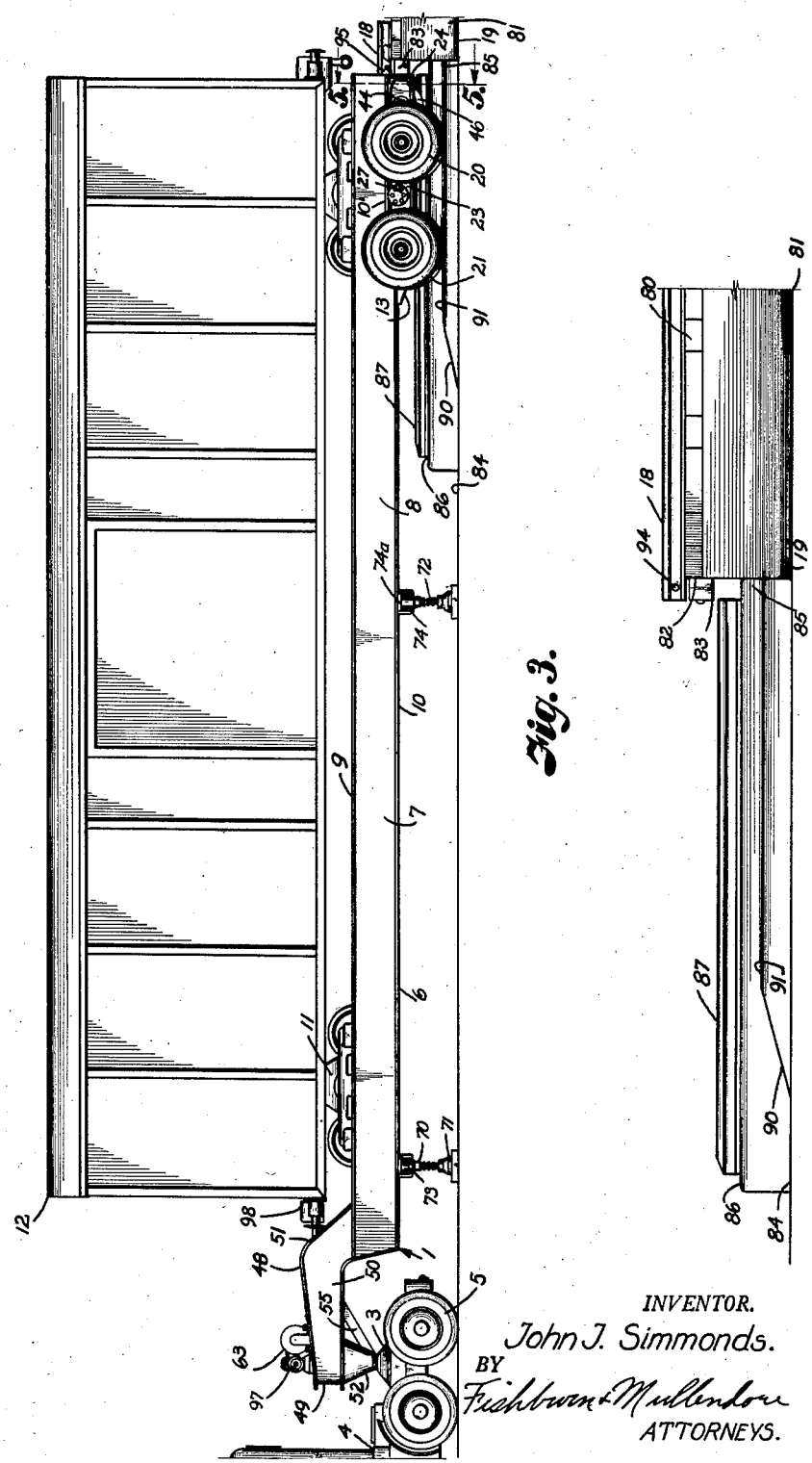
INVENTOR.
John J. Simmonds.
BY
Fishburn & Mullendore
ATTORNEYS.

May 13, 1958  J. J. SIMMONDS  2,834,485
TRAILER TRUCK FOR RAILROAD CARS AND LOADING DOCK THEREFOR
Filed Feb. 21, 1955  6 Sheets-Sheet 2
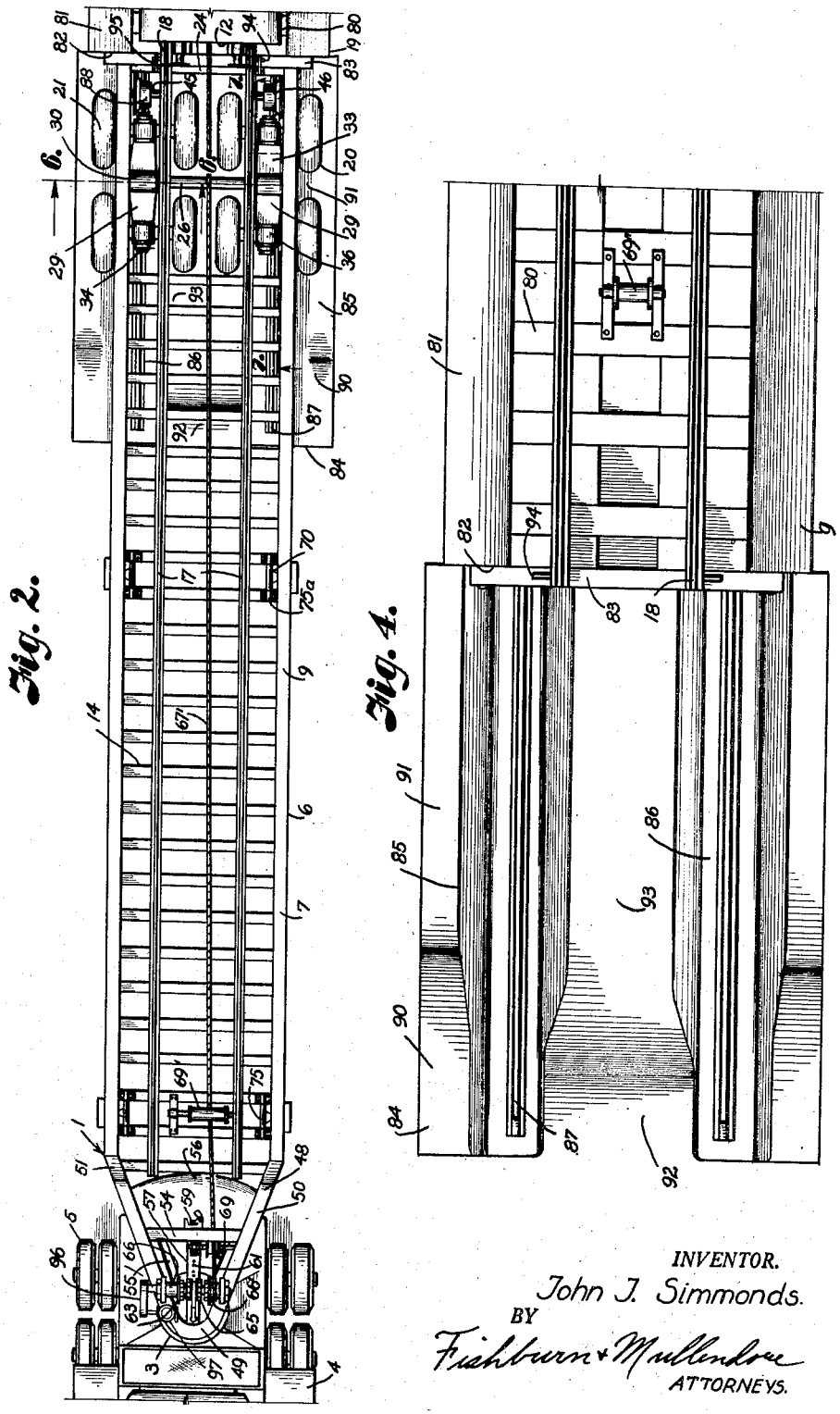
INVENTOR.
John J. Simmonds.
BY
Fishburn & Mullendore
ATTORNEYS.

May 13, 1958   J. J. SIMMONDS   2,834,485
TRAILER TRUCK FOR RAILROAD CARS AND LOADING DOCK THEREFOR
Filed Feb. 21, 1955   6 Sheets-Sheet 3
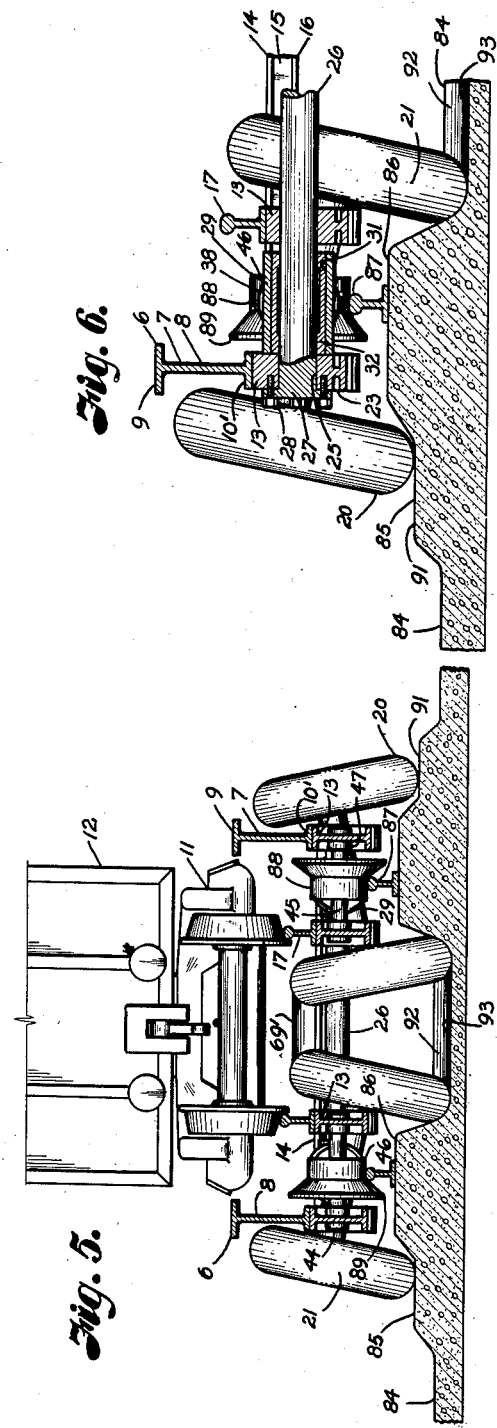
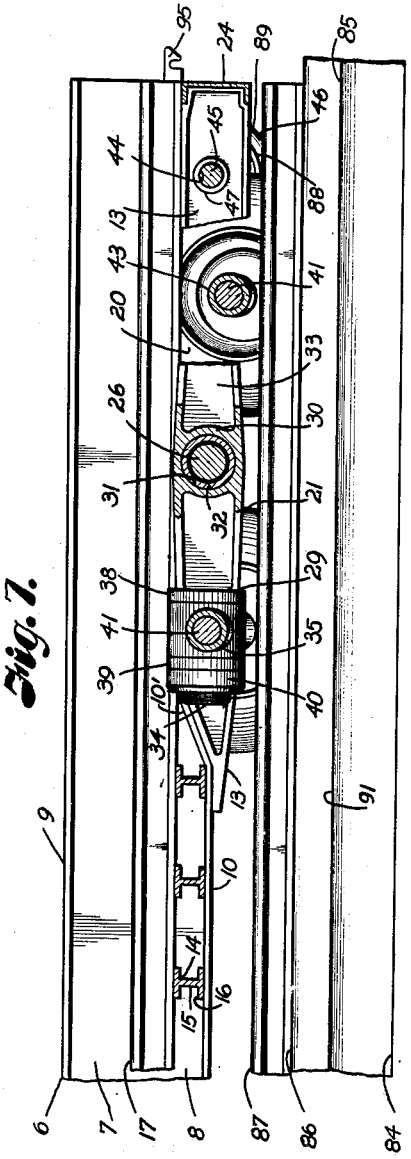
INVENTOR.
John J. Simmonds.
BY
Fishburn & Mullendore
ATTORNEYS.

May 13, 1958     J. J. SIMMONDS     2,834,485
TRAILER TRUCK FOR RAILROAD CARS AND LOADING DOCK THEREFOR
Filed Feb. 21, 1955     6 Sheets-Sheet 4
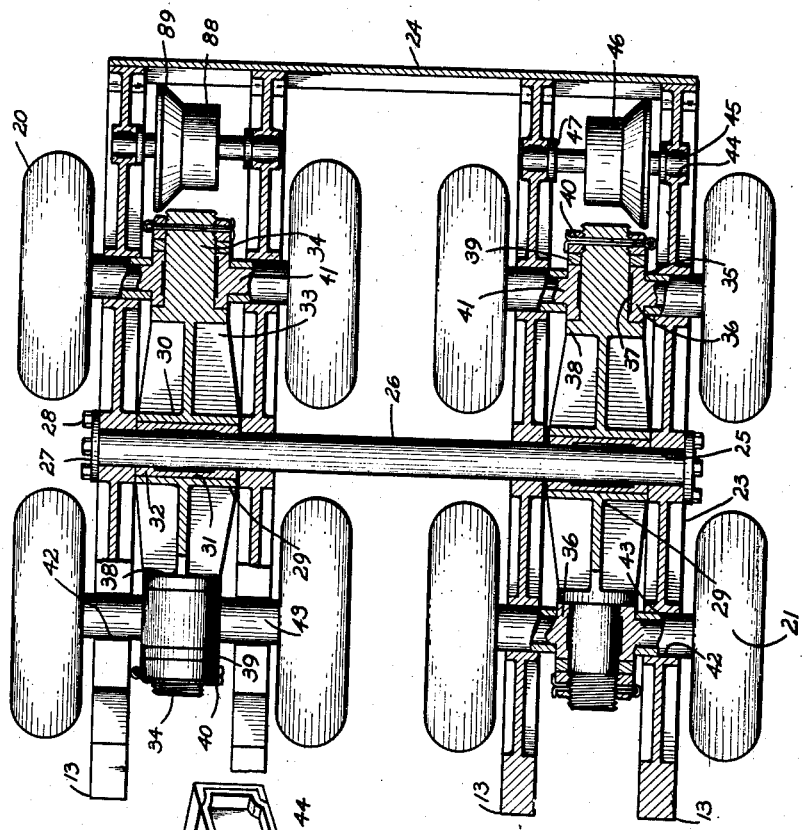
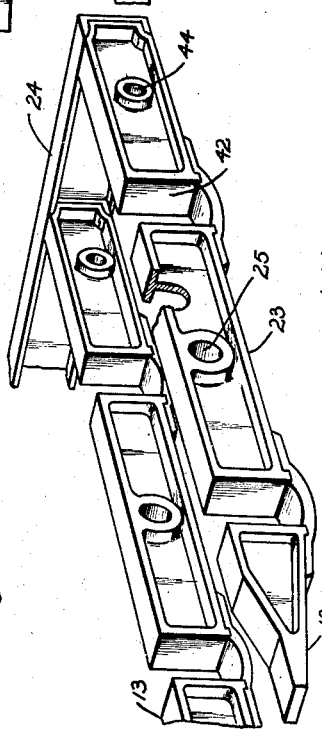
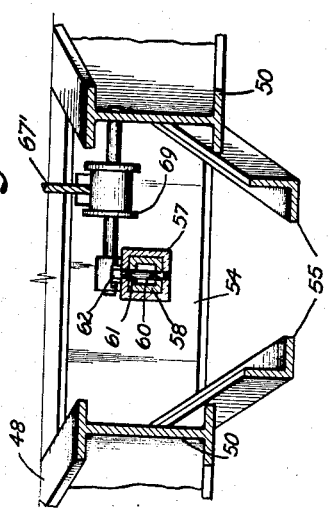
INVENTOR.
John J. Simmonds
BY
ATTORNEYS.

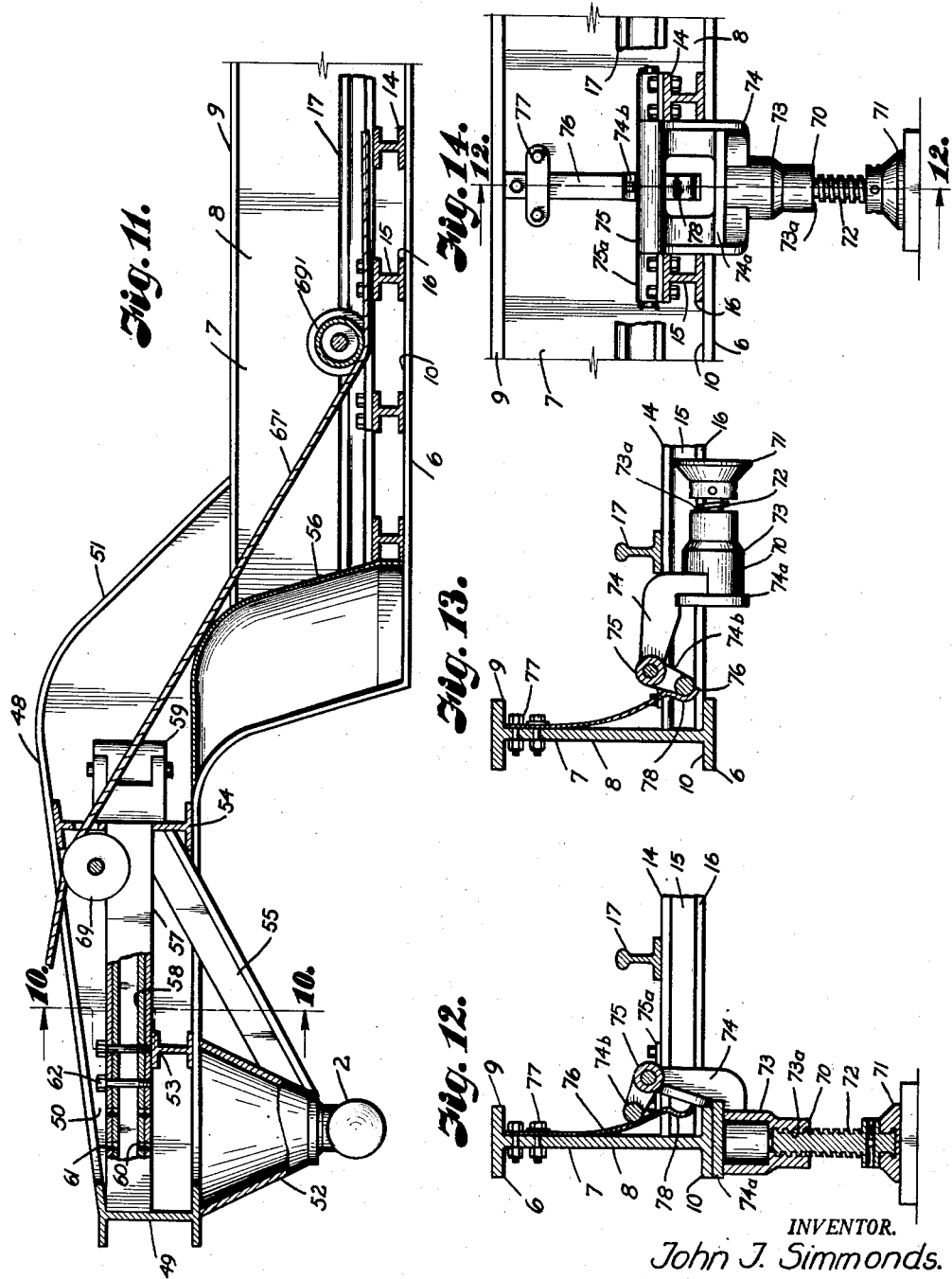

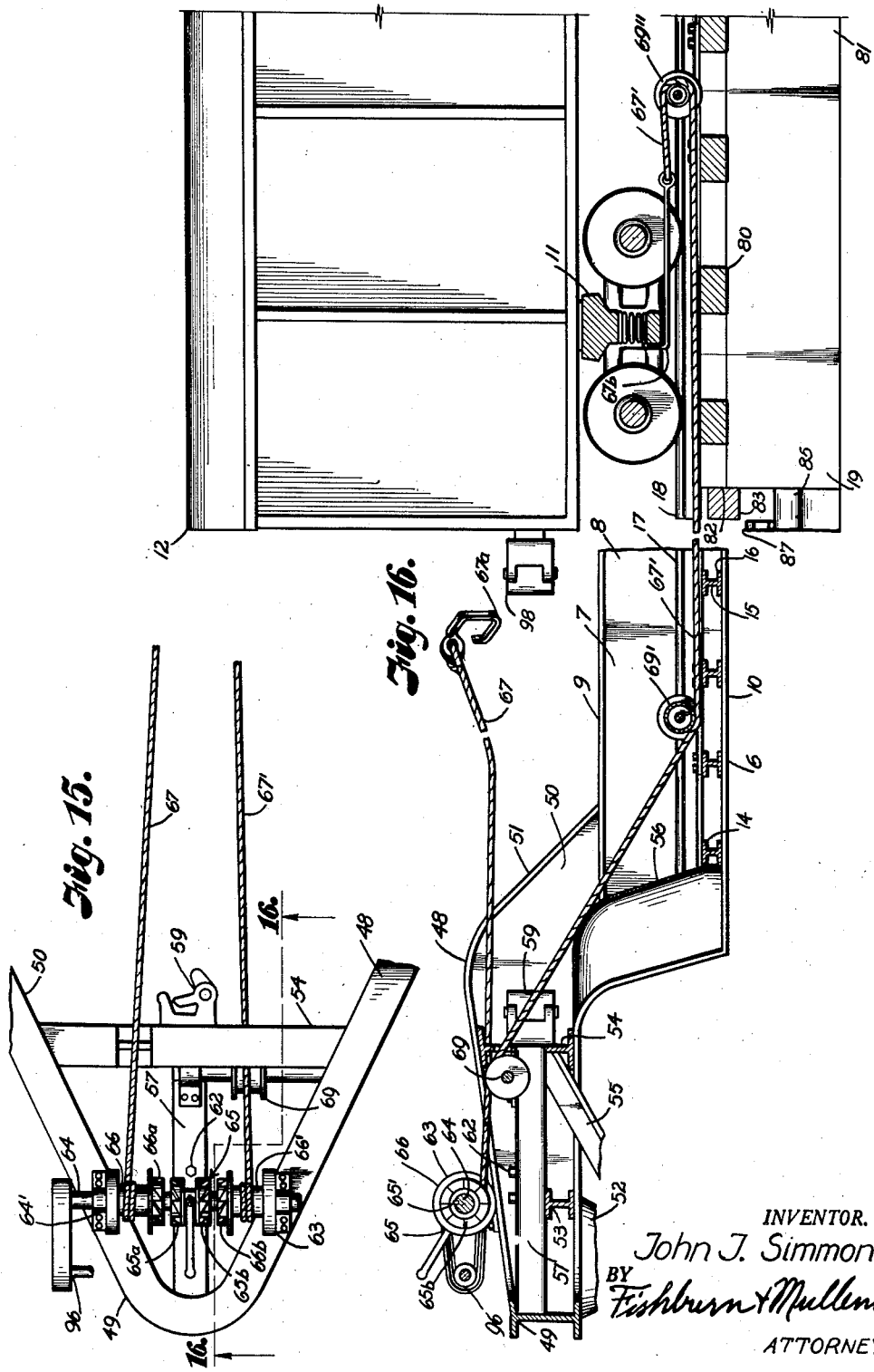

United States Patent Office 2,834,485
Patented May 13, 1958

2,834,485

TRAILER TRUCK FOR RAILROAD CARS AND LOADING DOCK THEREFOR

John J. Simmonds, Lawrence, Kans., assignor of one-half to Dick Williams, Lawrence, Kans.

Application February 21, 1955, Serial No. 489,623

3 Claims. (Cl. 214—38)

This invention relates to loading, moving and unloading of rail cars, and the like, for delivery of contents thereof to destinations having no rail facilities, and more particularly to a trailer truck for rail cars and a loading and unloading dock therefor.

Many manufacturing plants, wholesale and retail houses have locations at substantial distances from railroads and railroad spurs but find it desirable to order materials and supplies in rail car lots. At the present time, in such instances, it is necessary to unload the rail car and load the materials or supplies onto trucks for movement to the destination. This extra handling is expensive and time consuming and can be eliminated if the entire rail car is delivered to the destination.

The objects of the present invention are to provide a trailer truck and loading dock arrangement for moving rail cars from a railroad or rail spur onto the trailer truck and delivering and unloading the car onto similar loading docks at destinations having no rail facilities; to provide a trailer truck structure of low height for carrying rail cars and adjustably positioning same for suitable distribution of weight on the trailer truck; to provide such a trailer structure in the form of a semi-trailer for attachment and movement by a truck tractor, to provide such a trailer with wheel arrangements adapted to pass over regular surfaces with a minimum of tilting of the trailer wherein the wheel arrangement is such that it can be positioned so as not to interfere with low portions of the rail car in loading and unloading same from the trailer truck; to provide a trailer truck and dock structure with members for directing and positioning the trailer truck in alignment with spur tracks and the wheels of the trailer whereby the rail car will pass thereover during loading and unloading, to provide mechanism for moving and holding the rail car on the trailer truck; and to provide a trailer truck and dock arrangement for handling of rail cars that is strong and durable, easily manipulated for the loading, unloading and carrying of rail cars with a minimum of parts and adjustments for such operations.

In accomplishing these and other objects of the present invention, I have provided improved details of structure, the preferred forms of which are illustrated in the accompanying drawings, wherein:

Fig. 1 is a side elevation of a rail car trailer truck and loading dock with a rail car on the trailer.

Fig. 2 is a plan view of the trailer truck in unloading position relative to the loading dock.

Fig. 3 is a side elevation of the loading dock.

Fig. 4 is a plan view of the loading dock.

Fig. 5 is a transverse sectional view through the trailer and loading dock on the line 5—5, Fig. 1.

Fig. 6 is a transverse sectional view through the trailer axle on the line 6—6, Fig. 2.

Fig. 7 is a longitudinal sectional view through a portion of the trailer truck and loading dock on the line 7—7, Fig. 2.

Fig. 8 is a horizontal sectional view through the rear end of the trailer truck.

Fig. 9 is a partial perspective view of the rear wheel assembly supporting members.

Fig. 10 is a transverse sectional view through the trailer truck through the line 10—10, Fig. 11.

Fig. 11 is a longitudinal sectional view through the forward end of the trailer truck.

Fig. 12 is a transverse sectional view through the trailer truck on the line 12—12, Fig. 14, showing a supporting jack thereon in trailer supporting position.

Fig. 13 is a transverse sectional view through the trailer truck showing the jack in elevated position.

Fig. 14 is an elevational view of the jack in trailer supporting position.

Fig. 15 is a fragmentary plan view of the forward end of the trailer particularly illustrating the windlass for moving the rail car onto and off of the trailer.

Fig. 16 is a longitudinal section through the forward end of the trailer on line 16—16, Fig. 15, and the terminal portion of the rail track showing the cables for transferring the rail car to and from the trailer depending upon which of the two cables is connected with the rail car.

Referring more in detail to the drawings:

1 designates a trailer truck embodying the features of the present invention and illustrated in the form of a semi-trailer wherein the forward end has a depending king-pin 2 removably supported in a fifth wheel 3 adjacent the rear end of a suitable trailer tractor 4 whereby a suitable number of wheels 5 on the trailer tractor will have sufficient bearing area on a surface over which it is to be moved to adequately support the weight of the forward end of the trailer when carrying a loaded freight car.

The trailer truck 1 has a strong rigid frame 6 including laterally spaced structural members preferably in the form of I-beams 7 extending longitudinally of the trailer and forming the side members thereof. The I-beam side members 7 are preferably arranged with the webs 8 thereof substantially vertical and with the spacing between the side members such that the inner edges of the upper flanges 9 and lower flanges 10 have greater spacing than the width of any portion of the rail car trucks or any depending members on the body 11 of the rail car 12. The lower portions of the side members 7 at the rear end of the trailer are shaped whereby the lower flange 10' thereof above the wheel supporting structure is higher than the flange 10 in the intermediate portion of the trailer whereby said flanges 10' at the rear of the trailer will rest on trailer wheel supporting subframe 13 as later described.

A plurality of spaced transverse members 14 connect the side members 7. In the illustrated structure, the transverse members 14 are structural shapes, preferably H-beams, arranged with the webs 15 thereof vertically and with the lower flanges 16 at the ends of said transverse members resting on the upper surfaces of the lower flanges 10 of the side members 7. The ends of the transverse members 14 abut against the webs 8 of the side members and said transverse members are suitably secured to the side members as by welding the flanges and webs to the web 8 and lower flange 10 of said side members. The transverse members are of sufficient quantity and of suitable spacing whereby they will support the weight of a loaded freight car, and the upper surfaces of the transverse members cooperate to form a substantially level portion of the trailer. The rearmost transverse member is preferably slightly forwardly of the wheel structure at the rear of the trailer and the forwardmost of said transverse members 14 is adjacent the forward end of the side members 7.

A pair of rail car rails 17 are arranged in laterally spaced relation and extend longitudinally of the trailer. The rails 17 are equally spaced from the longitudinal center of the trailer and the spacing corresponds to the normal spacing of the rails of the railroad tracks. Also the rails 17 are preferably substantially the same size that is normally used in the spur tracks of railroads. The rails 17 rest on and are secured to the upper flange of the cross members 14, said rails extending from the foremost transverse member 14 to the extreme rear of the trailer whereby said rails may abut against the ends of spur tracks 18 on a loading dock 19 as later described.

The rear portion of the trailer is supported on a plurality of wheels 20 preferably having pneumatic tires 21 thereon and are carried by the sub-frame 13 arranged under and secured to the rear portion of the side members 7 and rails 17. The sub-frame 13 preferably consists of spaced sill members 23 arranged under and secured to each of the side members 7 and rails 17 and extend forwardly from the rear ends thereof to a rearmost transverse member 14. A structural member, such as a channel 24, extends transversely of the trailer and is secured to the rear ends of each of the sill members 23, the upper surface of the member 24 preferably being substantially on a plane with the upper surface of the sill members 23 whereby the side members 7 and rails 17 extend over and are secured to the upper surface of the rear member 24.

Each of the connections between the various members may be by bolts or other suitable fastening means but it is preferable to secure the members together by welding for simplicity of construction.

The sill members 23 each have aligned bores 25 substantially midway the length thereof for receiving a shaft 26 extending transversely of the trailer and adapted to support wheel carrying structures, later described. The shaft 26 is held in place by means of end plates 27 secured to the outer sill members 23 by suitable fastening devices 28.

Rocker arm structures 29 are mounted on the shaft 26 between the outside sill members 23 and the next adjacent sill member whereby said rocker arm assemblies move between the side members 7 and the adjacent rail members 17. Each of the rocker arms consists of a central portion 30 provided with a bore 31 in which is mounted a bearing member 32 that is rotatably mounted on the shaft 26 and has arm members 33 extending oppositely from the central portion 30 and terminating in trunnions 34 whose axes are aligned and extend longitudinally of the trailer.

Axle members 35 have center portions 36 provided with bores 37 adapted to be rotatably mounted on the trunnions 34 and held thereon against longitudinal movement by cooperation of a shoulder 38 on the arms 33 and a washer 39 and suitable fastening device such as a nut 40. The axle members 35 each have oppositely extending aligned axles 41 which extend beyond the adjacent sill members 23 and rotatably carry the wheels 20. Each of the sill members 23 are preferably provided with slots 42 through which the axle members extend. The slots are preferably of suitable shape and size to receive rollers 43 rotatably mounted on the axle members 41 for rolling contact with the sides of the slots during movement of the axle members which may result from the wheels passing over irregular surfaces.

In the particular structure illustrated, there are eight wheels at the rear end of the trailer, four being carried by each rocker arm and arranged whereby the axle members 35 will rotate about the longitudinal trunnions 34 and the trunnions will have up and down movement relative to the trailer frame due to the arms 33 being rotatable about the axis of the shaft 26 to provide a substantially universal movement of the rear wheels whereby they may pass over irregular surfaces with a minimum of movement of the rear end of the trailer frame.

The sill members 23 also have aligned bores 44 between the rearmost slot 42 and the rear member 24, the bores 44 providing bearings rotatably mounting shafts 45 in the outermost and next adjacent sills 23. Flanged rollers 46 are mounted on the shafts 45 between the rear axle members and the rear end of the trailer for engagement with alignment members as later described. The rollers 46 are preferably held against movement transversely of the trailer, as for example, by the rollers 46 being fixed on the shafts 45 and collars 47 fixed on said shafts and having bearing engagement with adjacent sill members 23.

The forward end of the trailer preferably has an upset or raised portion 48 including a structural shape such as an I-beam having its midportion bent in an arc as at 49 connecting diverging legs 50 which extend rearwardly substantially to the forward ends of the side members 7 and are then turned downwardly as at 51 and welded or otherwise suitably secured to the upper portion of the side members 7.

The king-pin 2 is carried by a supporting structure 52 that is suitably fixed to and depends from the forward end of the trailer adjacent the arcuate portion 49. Also transverse members 53 and 54 extend transversely of the upset portion and have their ends secured to the legs 50. A suitable brace 55 extends from the transverse member 54 to the supporting structure 52 of the king-pin. An arcuate curved heavy sheet 56 closes the forward end of the trailer between the upset portion and the main frame of the trailer and also further ties the parts together to form a rigid structure.

A tubular member 57 is supported in the upset forward portion of the trailer and is arranged longitudinally thereof preferably substantially on the longitudinal center, said tubular member preferably being a box-like structure with the ends thereof connected to the arcuate portion 49 and the transverse member 54 respectively and its intermediate portion secured to the transverse member 53 whereby the rear end of said box-like tubular member is open for slidably receiving a beam 58 in said box-like structure.

The beam 58 has a railroad freight car coupling member 59 fixed on the rear end thereof and there is along the length of the beam a plurality of spaced apertures 60 alignable with spaced apertures 61 in the boxlike member for receiving suitable fastening devices such as pins 62 whereby the beam may be adjusted longitudinally of the trailer to selectively position the coupling member 59 to provide desired distance between the coupling and the rear wheels of the trailer.

A winch 63, or the like, is mounted on the upset portion. The winch 63 includes a transverse shaft 64 having ends journaled in bearings 64' that are mounted on the legs 50. Loose on the shaft 64 on the respective sides of a sliding clutch collar 65 are winding drums 66 and 66' for cables 67 and 67'. The clutch collar 65 is slidably keyed to the shaft to turn therewith by a key 65' and has opposed clutch faces 65a and 65b for alternately engaging similar clutch faces 66a and 66b on the respective drums depending upon which of the cables is to be used. The cable 67 is adapted to be connected to the coupler of the rail car by means of a hook 67a when the drum 66' is operated to pull the rail car onto the trailer. A plurality of sheaves 69 are rotatably mounted at desired positions on the trailer to guide the cable 67' whereby it may be connected to the bolster of a freight car or the like by a hook 67b and the drum 66 operated to wind the cable 67' and pull the freight car off the trailer and onto the track of the spur or the track of the loading dock at the site of the plant. It is preferable that one of the sheaves 69 be mounted in the upset portion, another sheave 69' be mounted on the main frame and spaced from the plate 56 whereby the cable will operate thereover, as illustrated in Fig. 11. A sheave 69" is mounted between the rails of the spur track.

Suitable jacks or other adjustable supporting members 70 are arranged in spaced relation on the trailer for supporting same when disconnected from the tractor 4 for providing additional support during loading and unloading of a freight car from the trailer. The jacks 70 have a foot member 71 rotatably mounted on a threaded shank 72 which screws in a threaded opening 73a in a hollow member 73 secured to a plate 74a carried on arms 74 which are pivotally mounted on a shaft 75 supported by brackets 75a mounted on adjacent transverse members 14 adjacent the side members 7 whereby the jack swings between selected transverse members 14. A lug 74b extends from the arms 74 adjacent the shaft 75 and engages a resilient member 76 such as a flat spring having one end secured as by suitable fastening devices 77 to the web 8 of the adjacent side members 7. The resilient member has an arcuate portion 78 adjacent its free ends adapted to be engaged by the lug 74a when the jack is in raised position whereby the resilient member and lug retain the jack in said raised position as illustrated in Fig. 13. When the jack is swung downwardly, the plate 74a engages the lower flange 10 of the side member to support same as illustrated in Fig. 12.

The loading dock for use in loading the rail cars onto the trailers consists of a spur track having rails 18 supported by ties 80, or the like, on a suitable base structure 81. The base terminates as at 82 and a tie or other abutment 83 is secured to the end thereof and arranged under the ends of the tracks 18 whereby said tracks overhang the end of the base as illustrated in Fig. 3. At the end of the base 81, the surface of the roadway or the like is at a lower level than the tracks 18 and has ramps 85 thereon extending from the end of the base 81. The ramp includes spaced level portions 86 on each of which are fixed rails 87 arranged longitudinally and substantially parallel to the rails 18, the rails 87 being of such height that when engaged with the cylindrical portion 88 of the flanged rollers 46 in moving a trailer onto the ramp, the rails 87 and the rollers cooperate to position the ends of the rails 17 at the same height as the rails 18. Also the spacing of the rails 87 is such that they cooperate with the flanges 89 on the flanged rollers 46 whereby said flanges cooperate with the rails 87 to align the rails 17 with the rails 18. The ramp 85 at the outer sides of each of the level portions 86 has portions 90 sloping upwardly from the ends of the ramp and terminates in a substantially level portion 91 to raise the outer wheels of the trailer. Also the portions of the ramp inwardly from the portions 86 slope downwardly as at 92 and terminate in a level portion 93 to receive the inside wheels of the trailer whereby the wheels are tipped and the upper portions of the inside wheels lowered below the top of the rails 17 so as to provide no obstructions which would interfere with the movement of the rail car onto the trailer. The ends of the rails 18 have lugs 94 engageable by hooks 95 pivotally mounted on the rear end of the trailer to secure the trailer to the loading dock while loading and unloading a freight car from the trailer.

The shaft 64 may be operated by a driving connection 96 with an engine 97 which may be mounted on the upset portion 48 of the trailer.

In using a structure constructed as described, the trailer 1 is connected to a tractor or truck 4 and then moved to the loading dock, the tractor being utilized to furnish the power for moving the trailer. In moving the trailer to the loading dock, the trailer is aligned substantially with the dock and ramps thereof. Then the trailer is backed towards the dock whereby the rear wheels of the trailer move on the sloping portions 90 and 92 of the ramp to start tilting the wheels simultaneously with engagement of the flanged rollers 46 with the ends of the rails 87. The flanged rollers then guide the rear end of the trailer as it is moved towards the dock to effect substantial alignment of the rails 17 with the rails 18. As the trailer approached the end of the dock, the wheels take the position shown in Figs. 5 and 6 due to the contour of the ramps. When the rear end member 24 of the trailer abuts the tie 83, the hooks 95 are engaged with the lugs 94 to hold the trailer in loading position. Then, if desired for support at the intermediate portions of the trailer, the jacks 70 may be swung downwardly and the threaded shank 72 rotated whereby the jacks 70 carry part of the load and support the intermediate portions of the trailer. The hook 67a on the cable 67 is engaged with the coupler 98 of the rail car. The engine 97 is started to turn the shaft 64 and the clutch collar that is keyed thereto. The clutch collar is then moved into driving engagement with the drum 66 to rotate the drum and wind the cable 67, thereon, and thereby draw the car onto the trailer, the wheels of the rail car rolling directly from the tracks 18 onto the tracks 17. This movement is continued until the forward coupler 98 of the rail car engages the coupler 59 on the trailer. These couplers are then secured together to hold the car and prevent same from rolling backwardly on the trailer. It is also desirable to leave the cable 67 attached to the car to provide additional force tending to retain the car in position. If desired, additional conventional rail stops or blocks may be secured to the rails 17 adjacent the rail car wheels to block the rail car against forward or rearward movement.

It is desirable that the spacing between the axes of the axle members 41 be substantially the same as the spacing between the axes of the truck axles on the rail car and that when the rail car is moved onto the trailer, the rearmost truck be positioned whereby the axles thereof are directly over the axles of the wheels of the trailer. There is some variation in the length of rail cars and this difference is taken care of by the adjustment of the position of the coupler 59 on the trailer, the pins 62 being withdrawn and the beam 58 slid inside of the box member 57 to move the coupling 59 to the desired position whereby it will be latched with the coupler on the rail car. Then the pins 62 may be replaced to hold the coupler against longitudinal movement.

After the rail car is loaded onto the trailer, any jacks 70 that have been used for supporting the trailer are then operated by turning the threaded shanks thereof to screw same upwardly whereby said jacks can be swung into raised position as shown in Fig. 13. Then the hooks 95 are disengaged from the lugs 94 and the trailer is ready to move the rail car to its destination. At the destination, jacks 70 are swung downwardly and operated to support the forward and intermediate parts of the trailer whereby the tractor 4 may be disengaged from the trailer for other purposes while the rail car is being unloaded or the rail car may be unloaded onto a dock similar to the dock at the rail terminal. In this case the coupler 59 and the cable 67 are released from the rail car and the hook 67b is engaged with a part of the car truck, the cable having been run first over the sheaves 69, 69' and 69". The clutch collar is then shifted to drive the drum 66' and wind the cable thereon to draw the rail car off of the trailer onto the track portion of the dock. When the car has been unloaded, the tractor touring an empty trailer returns to reload the empty car thereon and the car is returned to the spur tracks where it can be again connected to a locomotive for further movement on the rails. When a loading dock is not provided at the plant, the contents of the rail car may be unloaded while the car is on the trailer.

It is believed obvious that I have provided an efficient structure for handling and moving rail cars to a destination having no rail facilities whereby the cost of handling merchandise, and the like, is substantially reduced by eliminating extra loading and unloading of such merchandise and the like.

What I claim and desire to secure by Letters Patent is:

1. A device for moving rail cars to destinations having no rail facilities comprising, a trailer truck having a frame with a substantially level portion extending from one end toward the other end thereof, said frame including spaced side members extending longitudinally of the frame and a plurality of spaced transverse members secured to the lower portions of the side members whereby the upper portions of the transverse members define the level portion of the frame, said side members having greater spacing than the width of a rail car, laterally spaced rails fixed on the transverse members of the frame and extending longitudinally thereof from the said one end, said rails having a spacing corresponding to the normal spacing of railroad rails, self-propelled wheel means supporting said other end of the frame, a shaft mounted on the frame and extending transversely thereof near said one end of the frame, aligned trunnions rotatably mounted on the shaft whereby the axes of the trunnions are movable in vertical planes extending longitudinally of the frame between the rails and the adjacent side members, oppositely directed axle members rotatably mounted on the trunnions whereby the axes of the axle members are movable in planes extending transversely of the frame, said axle members extending beyond the adjacent rails and side members, wheels rotatably mounted on the portions of the axle members extending beyond the adjacent rails and side members, said wheels being adapted to operate on a roadway at the end of a railroad track and at a lower elevation than said track, a ramp extending from the end of the railroad track and in alignment therewith, said ramp having spaced level portions, guide members fixed on the spaced level portions of the ramp in parallel relation to the railroad track, and means on the said one end of the frame engageable with spaced guide members on the ramp for guiding said end of the frame as the trailer is moved toward the end of the railroad track whereby the rails on the trailer are moved into vertical and horizontal alignment with the end of the railroad track, said ramp having portions between the level portions thereof of a lower level than the portions at each exterior side thereof adapted to be engaged by the wheels near said one end of the frame whereby the wheels on the inside of the rails on the trailer frame are lowered sufficiently to present no obstruction to passage of a rail car thereover.

2. A device for moving rail cars to destinations having no rail facilities comprising, a trailer truck having a frame with a substantially level portion extending from one end toward the other end thereof, said frame including spaced side members extending longitudinally of the frame and a plurality of spaced transverse members secured to the lower portions of the side members whereby the upper portions of the transverse members define the level portion of the frame, said side members having greater spacing than the width of a rail car, laterally spaced rails fixed on the transverse members of the frame and extending longitudinally thereof from the said one end, said rails having a spacing corresponding to the normal spacing of railroad rails, self-propelled wheel means supporting said other end of the frame, a shaft mounted on the frame and extending transversely thereof near said one end of the frame, aligned trunnions rotatably mounted on the shaft whereby the axes of the trunnions are movable in vertical planes extending longitudinally of the frame between the rails and the adjacent side members, oppositely directed axle members rotatably mounted on the trunnions whereby the axes of the axle members are movable in planes extending transversely of the frame, said axle members extending beyond the adjacent rails and side members, wheels rotatably mounted on the portions of the axle members extending beyond the adjacent rails and side members, said wheels being adapted to operate on a roadway at the end of a railroad track and at a lower elevation than said track, a ramp extending from the end of the railroad track and in alignment therewith, said ramp having spaced level portions, guide members fixed on the spaced level portions of the ramp in parallel relation to the railroad track, means on the said one end of the frame engageable with said spaced guide members on the ramp for guiding said end of the frame as the trailer is moved toward the end of the railroad track whereby the rails on the trailer are moved into vertical and horizontal alignment with the end of the railroad track, said ramp having portions between the level portions thereof of a lower level than the portions at each exterior side thereof adapted to be engaged by the wheels near said one end of the frame whereby the wheels on the inside of the rails on the trailer frame are lowered sufficiently to present no obstruction to passage of a rail car thereover, power means associated with the frame for connection with a rail car for moving same onto the rails on the frame, and means adjacent the other end of the trailer frame for connection to a rail car for holding same on the frame.

3. A device for moving rail cars to destinations having no rail facilities comprising, a trailer truck having a frame with a substantially level portion extending from one end toward the other end thereof, said frame including spaced side members extending longitudinally of the frame and a plurality of spaced transverse members secured to the lower portions of the side members whereby the upper portions of the transverse members define the level portion of the frame, said side members having greater spacing than the width of a rail car, laterally spaced rails fixed on the transverse members of the frame and extending longitudinally thereof from the said one end, said rails having a spacing corresponding to the normal spacing of railroad rails, self-propelled wheels means supporting said other end of the frame, a shaft mounted on the frame and extending transversely thereof near said one end of the frame, aligned trunnions rotatably mounted on the shaft whereby the axes of the trunnions are movable in vertical planes extending longitudinally of the frame between the rails and the adjacent side members, oppositely directed axle members rotatably mounted on the trunnions whereby the axes of the axle members are movable in planes extending transversely of the frame, said axle members extending beyond the adjacent rails and side members, wheels rotatably mounted on the portions of the axle members extending beyond the adjacent rails and side members, said wheeels being adapted to operate on a roadway at the end of a railroad track and at a lower elevation than said track, a ramp extending from the end of the railroad track and in alignment therewith, said ramp having spaced level portions, rails fixed on the spaced level portions of the ramp in parallel relation to the railroad track, means on the said one end of the frame engageable with said spaced rails on the ramp for guiding said end of the frame as the trailer is moved toward the end of the railroad track whereby the rails on the trailer are moved into vertical and horizontal alignment with the end of the railroad track, said ramp having portions between the level portions thereof of a lower level than the portions at each exterior side thereof adapted to be engaged by the wheels near said one end of the frame whereby the wheels on the inside of the rails on the trailer frame are lowered sufficiently to present no obstruction to passage of a rail car thereover, means for securing the frame of the trailer to the ends of the railroad track for maintaining alignment during loading and unloading of a rail car on the frame, power means associated with the frame for connection with a rail car for moving same onto the rails on the frame, and a railroad coupling longitudinally adjustable on the frame and mounted thereon at the other end of the trailer frame for connection to a rail car for holding same on the frame.

(References on following page)

References Cited in the file of this patent

UNITED STATES PATENTS

| | | | |
|---|---|---|---|
| 1,132,960 | Moreland | Mar. 23, | 1915 |
| 1,885,399 | Wren | Nov. 1, | 1932 |
| 2,099,288 | Allen | Nov. 16, | 1937 |
| 2,121,862 | Dodge | June 28, | 1938 |
| 2,409,870 | Kinnaird | Oct. 22, | 1946 |
| 2,691,449 | Claybourn | Oct. 12, | 1954 |
| 2,711,835 | Kappen | June 28, | 1955 |

FOREIGN PATENTS

| | | | |
|---|---|---|---|
| 240,260 | Great Britain | Oct. 1, | 1925 |
| 715,069 | France | Sept. 21, | 1931 |